(12) United States Patent
Byun et al.

(10) Patent No.: US 6,190,224 B1
(45) Date of Patent: Feb. 20, 2001

(54) AUTOMATION SYSTEM AND A METHOD FOR ASSEMBLING A WORKPIECE

(75) Inventors: Sung-Joon Byun; Jong-Beom An; Hyung-Jin Yun; Min-Young Heo, all of Choongcheongnam-do (KR)

(73) Assignee: Samsung Electronics Co., Ltd., Seoul (KR)

(*) Notice: Subject to any disclaimer, the term of this patent is extended or adjusted under 35 U.S.C. 154(b) by 0 days.

(21) Appl. No.: 09/410,761

(22) Filed: Oct. 1, 1999

(30) Foreign Application Priority Data

Oct. 2, 1998 (KR) .................................................. 98-41678

(51) Int. Cl.[7] ........................................................ H01J 9/00

(52) U.S. Cl. ................................................. 445/24; 29/430

(58) Field of Search ................................. 445/24; 29/430, 29/793, 794

(56) References Cited

U.S. PATENT DOCUMENTS

| | | | |
|---|---|---|---|
| 5,090,105 | * 2/1992 | DeRees | 29/793 |
| 5,319,845 | * 6/1994 | Watanabe et al. | 29/701 |
| 5,347,700 | * 9/1994 | Tominaga et al. | 29/430 |
| 5,390,248 | * 2/1995 | Segan et al. | 381/56 |

\* cited by examiner

*Primary Examiner*—Kenneth J. Ramsey
(74) *Attorney, Agent, or Firm*—Howrey Simon Arnold & White, LLP

(57) ABSTRACT

Disclosed is an automation system and a method for assembling a workpiece. The system includes a first stocker having a plurality of first substrates with a plurality of grades of defects, and a second stocker having a plurality of second substrates to be paired with one of the first substrates, and having a plurality of grades of defects. The second stocker receives the grade of the first substrate and selects the second substrate with a grade corresponding to the grade of the received first substrate. The workpiece is assembled by receiving one of the first substrates and determining the grade of the received first substrate. The grades of the second substrates in a cassette is surveyed and determined if there is a second substrate with the same grade as the received first substrate. One of the second substrates is selected if it is determined that there is a second substrate with a grade corresponding to that of the received first substrate. The selected second substrate is placed in a new cassette. The first substrate and the second substrate are simultaneously supplied to respective production lines. If it is determined that there are no second substrates with the same grade as the received first substrate, the first substrate is held on stand-by.

34 Claims, 11 Drawing Sheets

AUTOMATION SYSTEM AND A METHOD FOR ASSEMBLING A WORKPIECE

BACKGROUND OF THE INVENTION

1. Field of the Invention

The present invention relates to an automation system and a method for assembling a workpiece, and more particularly to an automation system and a method for supplying and assembling a paired workpiece such as an LCD panel.

2. Description of the Related Art

The liquid crystal display (LCD) panel is made by assembling two substrates. Sealant is applied around edges of the two substrates to seal the two substrates, and liquid crystal material is injected between the two substrates. One of the two substrates is a color filter (CF) substrate on which are formed a red, green and blue color filter, in addition to a black matrix. The other substrate is a thin film transistor (TFT) substrate on which are formed a plurality of pixel electrodes and TFTs in pixel regions.

FIG. 1 shows a schematic diagram of a partial sectional view of a typical LCD panel. As shown in the drawing, the LCD panel includes a TFT substrate 10, a CF substrate 1, spacers 20, and a sealant 30. The TFT substrate 10 and the CF substrate 1 are maintained to have a predetermined gap therebetween by the spacers 20, and the sealant 30 hermetically joins the TFT substrate 10 and CF substrate 1.

A typical method for manufacturing the LCD having the paired TFT substrate 10 and CF substrate 1 will be described hereinafter.

FIG. 2 is a schematic perspective view of uncut TFT substrate 10 and CF substrate 1, each having a plurality of cells. In the conventional LCD manufacturing method, a plurality of cells are formed on each of the TFT substrate 10 and the CF substrate 1 to enhance productivity. In FIG. 2, the CF substrate 1 has six cells (1–6) and the TFT substrate 10 has six cells (11–16). Each cell of the CF substrate 1 corresponds to one cell of the TFT substrate 10 to form cell pairs. For example, the cell 12 of the TFT substrate 10 corresponds to the cell 1 of the CF substrate 1.

Two separate substrates 10 and 1 are assembled together and each cell pair is cut to produce an LCD panel. However, while manufacturing the uncut TFT substrate 10 and CF substrate 1, one or more cells may become defective. One defective cell comprising an LCD panel renders the entire LCD panel useless and to be discarded. Accordingly, the TFT substrate 10 and the CF substrate 1 are given a grade depending on which, if any, of the cells are defective. The TFT substrate 10 and the CF substrate 1 of the same grade are assembled together, thereby increasing productivity.

The grade is an indication of defects on the substrates 10 and 1, and varies according to the number and the location of the defective cells that the substrates 10 and 1 have. Since each of the TFT substrate 10 and the CF substrate 1 of FIG. 2 has six cells, there are total 64 possible grades ($2^6$) for each substrate.

The grades are outlined in Table 1 below. Defects are indicated by X, while O indicates no defects.

TABLE 1

| Grade | Cell 1 | Cell 2 | Cell 3 | Cell 4 | Cell 5 | Cell 6 | Pattern |
|---|---|---|---|---|---|---|---|
| 0 | O | O | O | O | O | O | OOOOOO |
| 1 | X | O | O | O | O | O | XOOOOO |
| 2 | O | X | O | O | O | O | OXOOOO |
| 3 | X | X | O | O | O | O | XXOOOO |
| 4 | O | O | X | O | O | O | OOXOOO |
| 5 | X | O | X | O | O | O | XOXOOO |
| 6 | O | X | X | O | O | O | OXXOOO |
| 7 | X | X | X | O | O | O | XXXOOO |
| 8 | O | O | O | X | O | O | OOOXOO |
| 9 | X | O | O | X | O | O | XOOXOO |
| 10 | O | X | O | X | O | O | OXOXOO |
| 11 | X | X | O | X | O | O | XXOXOO |
| ... | ... | ... | ... | ... | ... | ... | ... |
| 60 | O | O | X | X | X | X | OOXXXX |
| 61 | X | O | X | X | X | X | XOXXXX |
| 62 | O | X | X | X | X | X | OXXXXX |
| 63 | X | X | X | X | X | X | XXXXXX |

As shown in Table 1 above, the total number of possible grades is 64. A substrate with no defects has a 'OOOOOO' pattern and a grade of '0' and a substrate with all defective cells has a 'XXXXXX' pattern and a grade of '63'.

As stated above, if one of the two cells forming an LCD panel is defective, the entire LCD panel must be discarded. So, for example, if the cell 1 of the CF substrate and the cell 15 of the TFT substrate are defective and these substrates are assembled, the LCD panel of the cell 12 and the cell 1 as well as the LCD panel of the cell 15 and the cell 6 should be discarded. Therefore, it is necessary to sort out the substrates according to a grade so that substrates having the same number and location of defective cells are assembled together in order to minimize the number of assembled LCD panels to be discarded.

SUMMARY OF THE INVENTION

The present invention has been made in an effort to solve the above problems.

It is an object of the present invention to provide an automation system and a method for assembling a paired workpiece (i.e., an LCD panel) that automatically assembles a TFT substrate and a CF substrate according to a grade such that a normal cell of either TFT substrate or CF substrate is not paired with an opposing substrate having a defective cell.

To achieve the above object, the present invention provides an automation system and a method for the assembly of a paired workpiece (i.e., an LCD panel). The automation system includes a storage for the parts, a sorter that can select the parts according to the external command or information and a host that controls the entire workflow. In another aspect of the present invention, the automation system may also include a production line that can process a part and assemble together. Methods of operating these systems are also presented.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

The whole workflow of the automation system including the steps described hereinafter is generally controlled by a host computer (not shown). The host computer has an access to all or portions of information on the parts, including their defect grades, locations and the numbers, etc. The host computer has necessary information available to the equipments or device that process the work pieces. The host computer can be any kind of commercially available computer systems or workstations.

Figure 1:
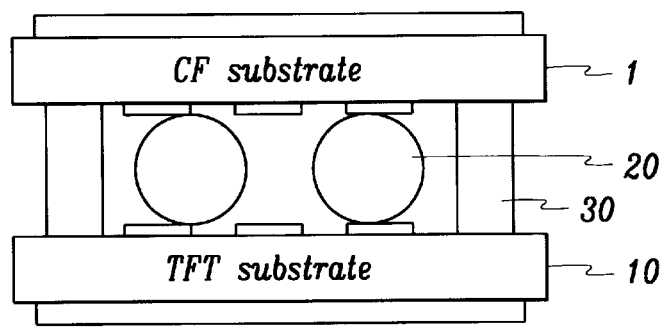
FIG. 1 is a schematic partial sectional view of a typical LCD panel.
Figure 2:
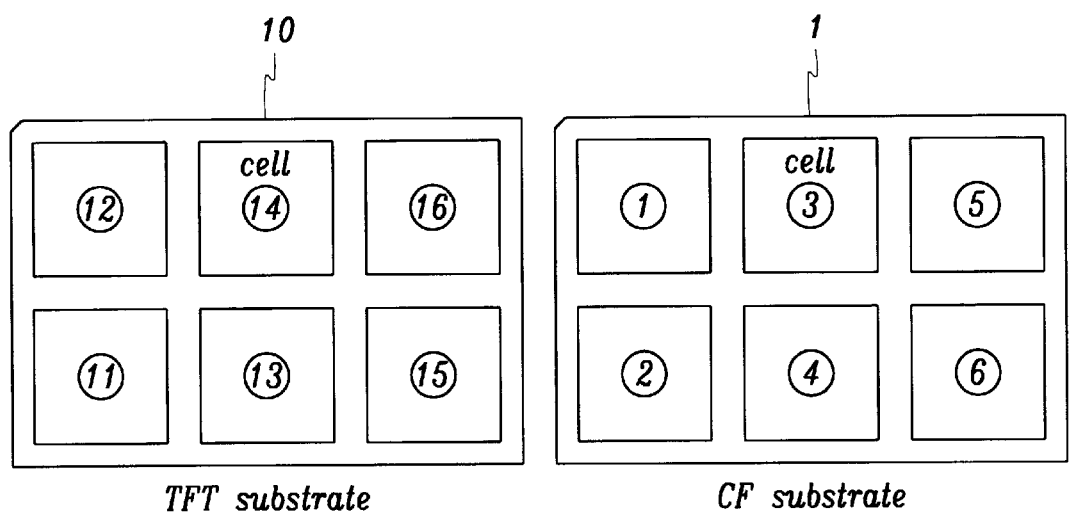
FIG. 2 is a schematic perspective view of uncut TFT and CF substrates each having a plurality of cells.
Figure 3:
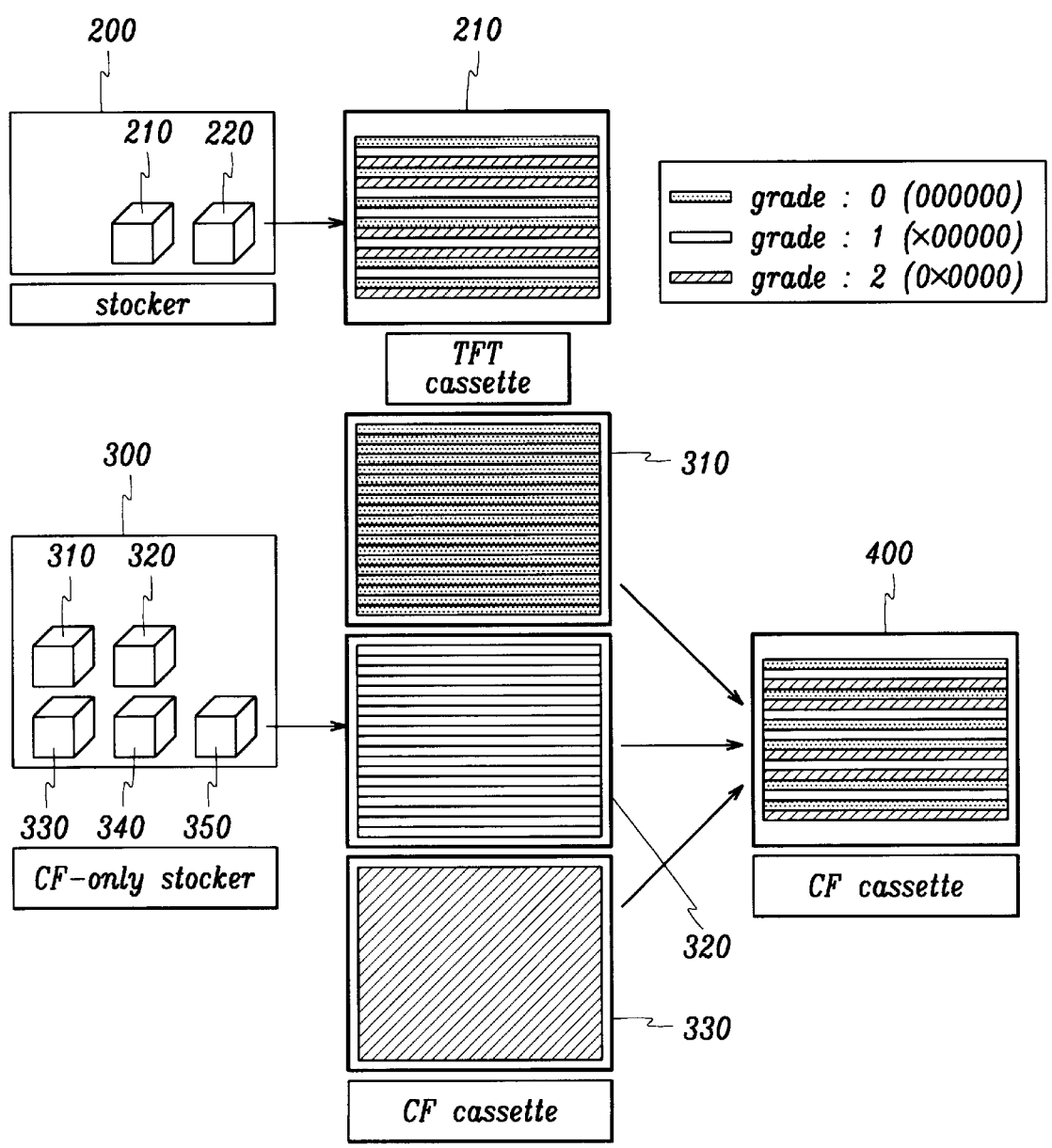
FIG. 3 is a block diagram of an automation system for assembling a workpiece according to a first preferred embodiment of the present invention.

FIG. 3 shows a block diagram of an automation system for assembling a workpiece according to a first preferred embodiment of the present invention. A plurality of TFT cassettes 210–220 are provided in a stocker 200, and a plurality of CF cassettes 310–350 are provided in a CF-only stocker 300. TFT substrates (not shown) are placed at random in the TFT cassettes 210–220, while CF substrates (not shown) are placed in the CF cassettes 310–350 according to a grade. That is, the TFT substrates are placed in the TFT cassettes 210–220 regardless of the grade, whereas the CF cassettes 310–350 holds CF substrates of an identical grade.

Figure 4:
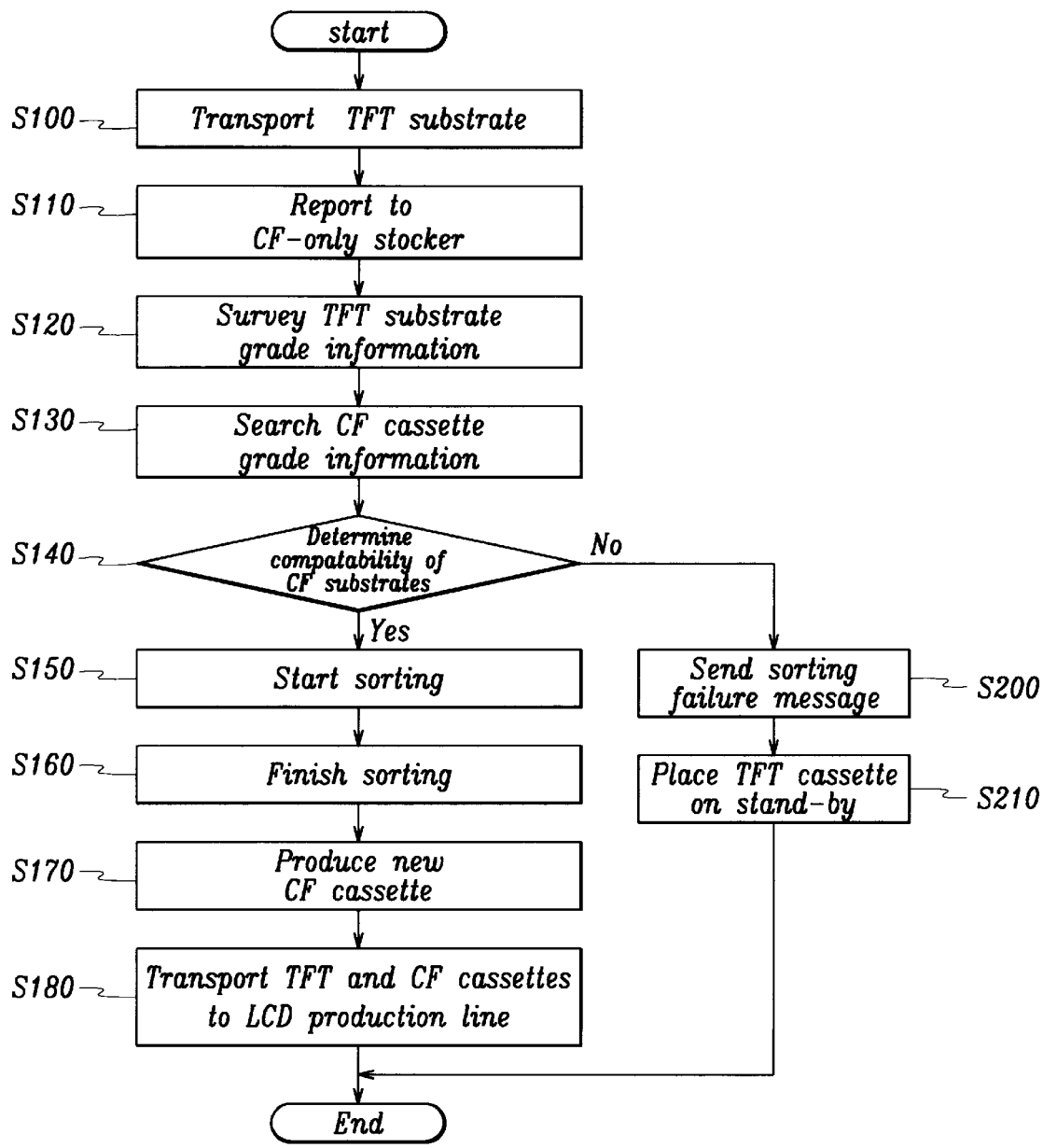
FIG. 4 is a flow chart of an operation of the automation system shown in FIG. 3.

FIG. 4 shows a flow chart of an operation of the automation system shown in FIG. 3. When the TFT cassette 210 is transported (step S100), arrival of the TFT cassette 210 and information on the grades of the TFT substrates in the TFT cassette 210 are reported to the CF-only stocker 300 (step S110). Next, the CF-only stocker 300 surveys the information on the grades of the TFT substrates in the TFT cassette 210 (step S120), then the CF-only stocker 300 searches information on the grades of the CF cassettes 310–350 (step S130) and determines if there are CF substrates with the same grades as the TFT substrates in the arrived TFT cassette 210 (step S140).

If there are CF substrates in the CF cassettes 310–350 having the same grades as the TFT substrates in the TFT cassette 210, CF substrates are sorted (step S150). CF substrates having grades identical to the TFT substrates in the TFT cassette 210 are placed in an empty CF cassette 400 in the same order as the TFT substrates are placed in the TFT cassette 210. The CF substrate sorting operation is completed (step S160), thereby filling a new cassette of CF substrates (step S170). Finally, the TFT cassette 210 and the newly prepared CF cassette are both transported to an LCD production line (step S180).

The CF substrates are selected by a sorter. The sorter is a device that can select a work piece according to the information and arrange it based on the characteristic of the works piece. For example, a robot arm in combination with a host computer can function as a sorter.

In step S140, if there are no CF substrates with the same grades as the TFT substrates in the arrived TFT cassette 210, a sorting failure message is sent to the stocker 200. Then, the stocker 200 holds the arrived TFT cassette 210 on stand-by.

Figure 5:
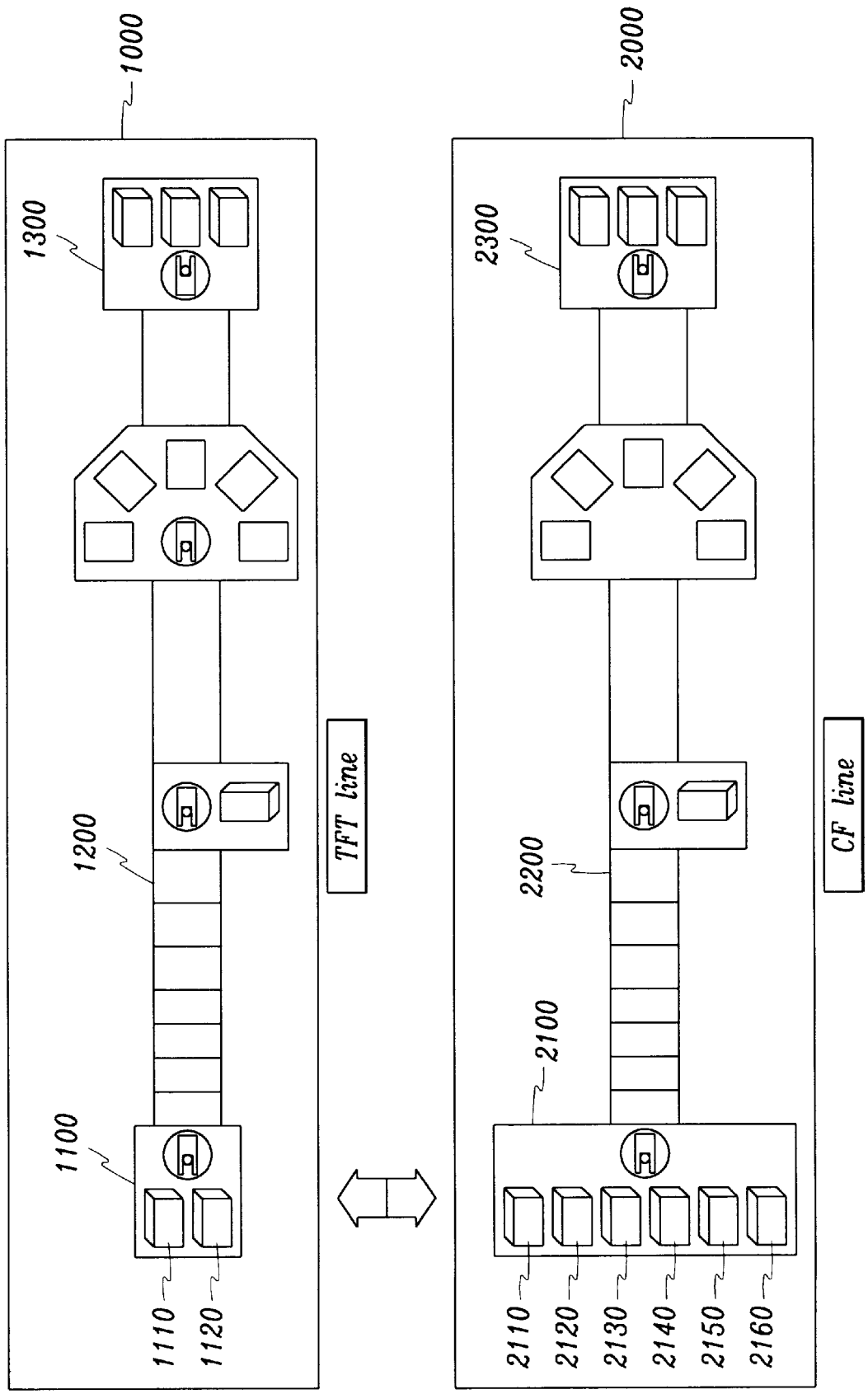
FIG. 5 is a block diagram of an automation system for assembling a workpiece according to a second preferred embodiment of the present invention.

FIG. 5 shows a block diagram of an automation system for assembling a workpiece according to a second preferred embodiment of the present invention. The automation system according to the second preferred embodiment of the present invention comprises a TFT line 1000 and a CF line 2000. The TFT line 1000 includes a TFT cassette receiver 1100, a TFT operation section 1200, and a TFT unloader 1300. The CF line 2000 includes a CF cassette receiver 2100, a CF operation section 2200, and a CF unloader 2300. TFT cassettes 1110–1120 are supplied to the TFT cassette receiver 1100 and CF cassettes 2110–2160 are supplied to the CF cassette receiver 2100. The TFT cassettes 1110–1120 hold TFT substrates of various grades, while each of the CF cassettes 2110–2160 holds CF substrates of the same grades.

The TFT operation section 1200 and the CF operation section 2200 respectively perform sequential processes on the substrates. The processes include cleaning, heating, alignment layer coating, and inspecting. The TFT unloader 1300 and the CF unloader 2300 respectively hold the substrates when finishing the above processes.

Figure 6:
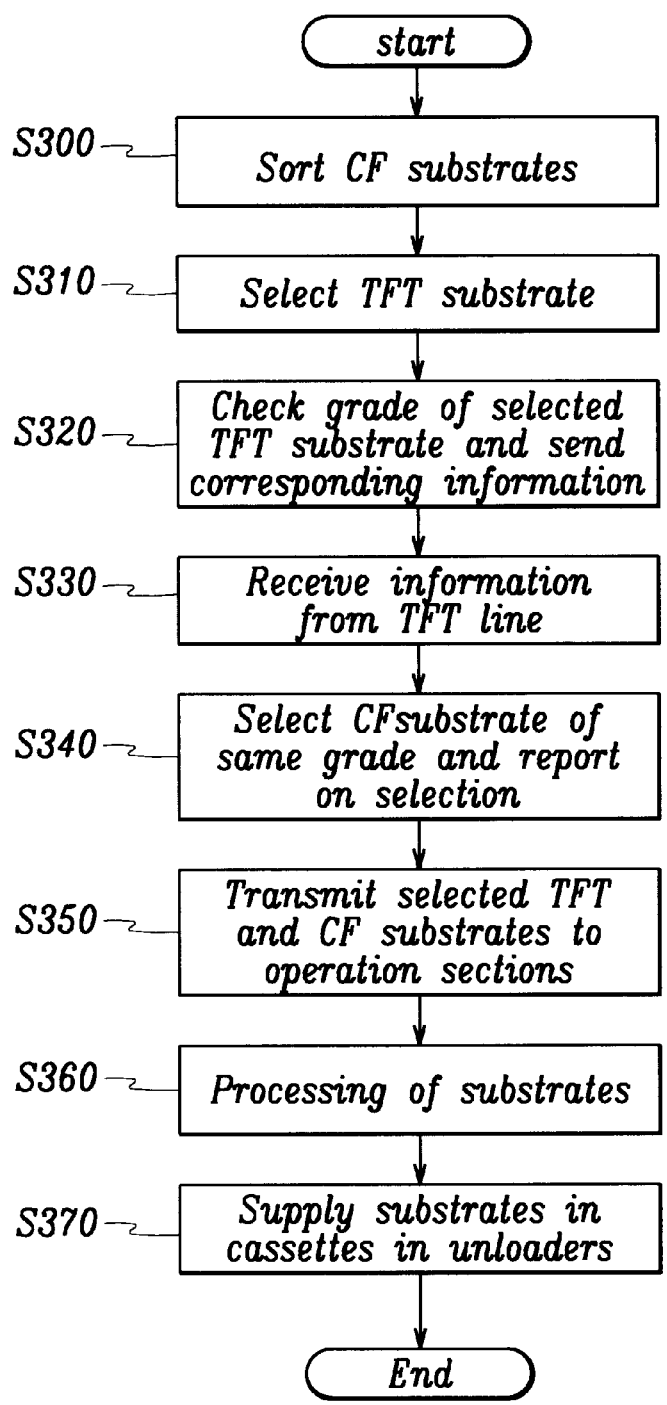
FIG. 6 is a flow chart of an operation of the automation system shown in FIG. 5.

FIG. 6 shows a flow chart of an operation of the automation system shown in FIG. 5. First, in step S300, CF substrates are pre-sorted and put into the CF cassettes 2110–2160 so that each of the cassettes holds CF substrates of the same grades. When a TFT substrate is selected from one of the TFT cassettes 1110–1120 (step S310), the TFT line 1000 checks the grade of the selected substrate and transmits the grade information to the CF line 2000 (step S320). Next, the CF line 2000 receives this information (step S330), and selects a CF substrate from a CF cassette holding substrates of the same grade as the selected TFT substrate. Then, it reports to the TFT line 1000 of selecting the CF substrate (step S340).

Subsequently, the TFT line 1000 and the CF line 2000 simultaneously transmit the selected substrates respectively to the TFT operation section 1200 and the CF operation section 2200 (step S350). This might be controlled by the host or the equipment itself. Next, the substrates undergo the sequential processes of cleaning, heating, alignment layer coating, and inspecting (step S360). The TFT substrate is supplied to a cassette in the TFT unloader 1300 and the CF substrate is supplied to a cassette in the CF unloader 2300 (step S370). Accordingly, the grades of the substrates in the cassettes of the TFT unloader 1300 correspond to the grades of the substrates in the cassettes of the CF unloader 2300.

In the above method utilizing the automation system of the second preferred embodiment of the present invention, production operations are performed simultaneously on TFT substrate and the CF substrate of the same grade. As a result, the amount of time required for assembling the TFT substrate and the CF substrate of the same grade is greatly reduced.

Figure 7:
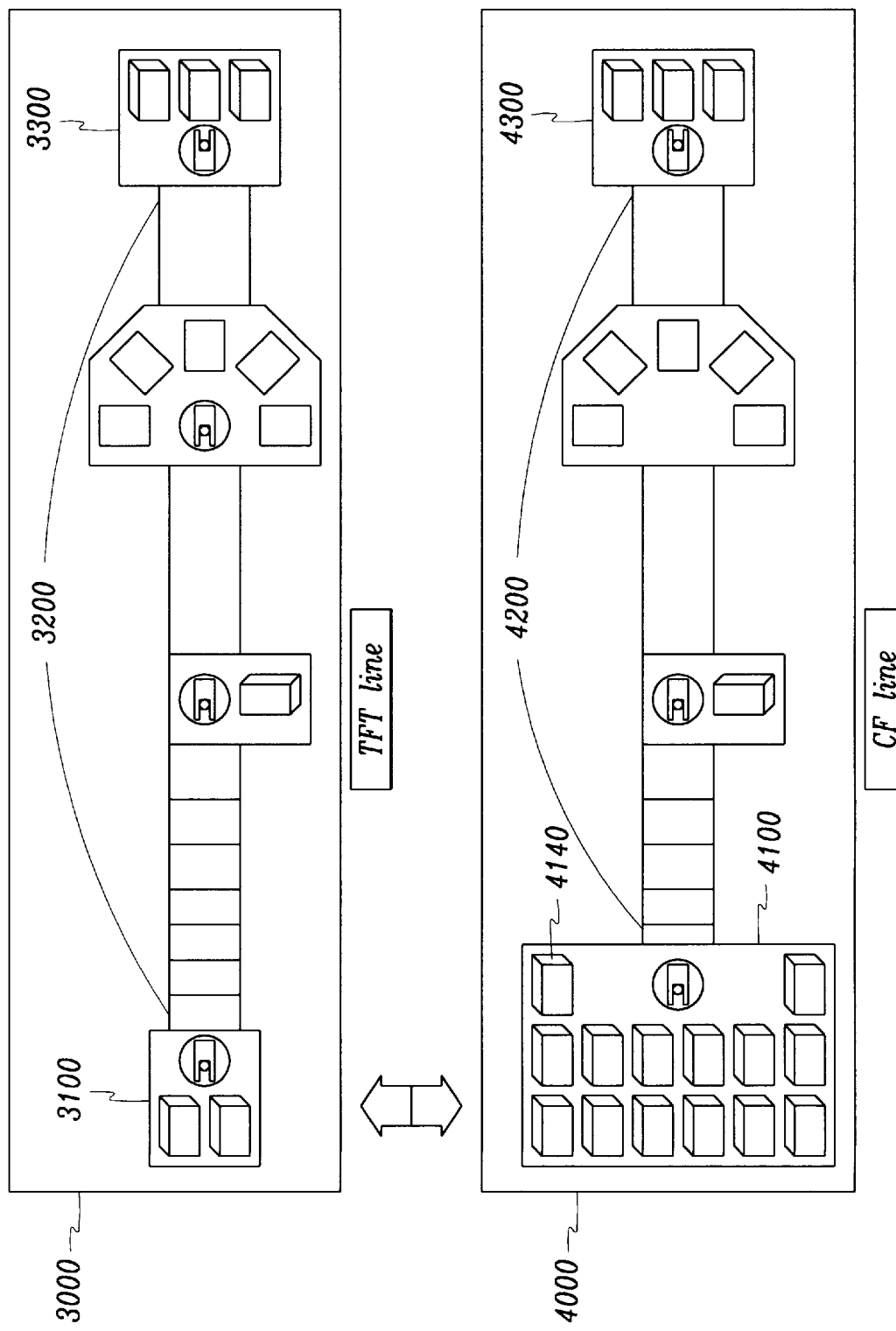
FIG. 7 is a block diagram of an automation system for assembling a workpiece according to a third preferred embodiment of the present invention.

FIG. 7 shows a block diagram of an automation system for assembling a workpiece according to a third preferred embodiment of the present invention. In the automation system of the third preferred embodiment, a cassette receiver is integrated with a stocker 4100 of a CF line 4000. A TFT line 3000 in this embodiment includes a TFT cassette receiver 3100, a TFT operation section 3200, and a TFT unloader 3300, and these elements of the TFT line 3000 are identical in structure and operation to the elements of the TFT line 1000 of the second embodiment. The CF line 4000 includes the stocker 4100, a CF operation section 4200, and a CF unloader 4300, and, as described above, the CF cassette receiver is integrated with the stocker 4100. A dummy cassette 4140 having dummy substrates is included in the stocker 4100.

The dummy cassette 4140 is used in two occasions: when the CF line 4000 first begins its operation; and when the TFT line 3000 malfunctions. Because various problems may occur when the CF line 4000 is initially operated, for example problems related to imprecise settings, etc., dummy substrates are first put through the processes until the CF line 4000 is found to be operating correctly to avoid waste of real CF substrates. Likewise, if the TFT line 3000 malfunctions, the dummy CF substrates are put through the processes of the CF line 4000 until the TFT line 3000 is fixed. It may reduce the disadvantages of stopping the CF line 4000 and then restarting it.

The TFT line 3000 and the CF line 4000 of the third embodiment operate in the same manner as the TFT line 1000 and the CF line 2000, respectively, of the second embodiment shown in FIG. 5 except for the following differences.

First, the CF line 4000 of the third embodiment does not perform sorting of the CF substrates as in the CF line 2000 of the second embodiment. Accordingly, a CF cassette in the stocker of the CF line 4000 does not have substrates of the same grade. In the CF line 2000 of the second embodiment, since the sorting operation is performed using a predetermined number of the CF cassettes supplied to the CF cassette receiver 2100, there is a limit to the number of grades of the cassette substrates that can be accommodated in the CF cassette receiver 2100. However, in the CF line 4000 of the third embodiment, because the CF cassette receiver is integrated with the stocker 4100, it is possible to have all grades of CF substrates available for pairing with the TFT substrates.

Second, as described above, since the CF cassette receiver is integrated with the stocker 4100 of the CF line 4000 in the third embodiment, it is also possible to perform production operations on the dummy substrates when the TFT line 3000 is malfunctioning and when the CF line 4000 first starts its operation.

Figure 8:
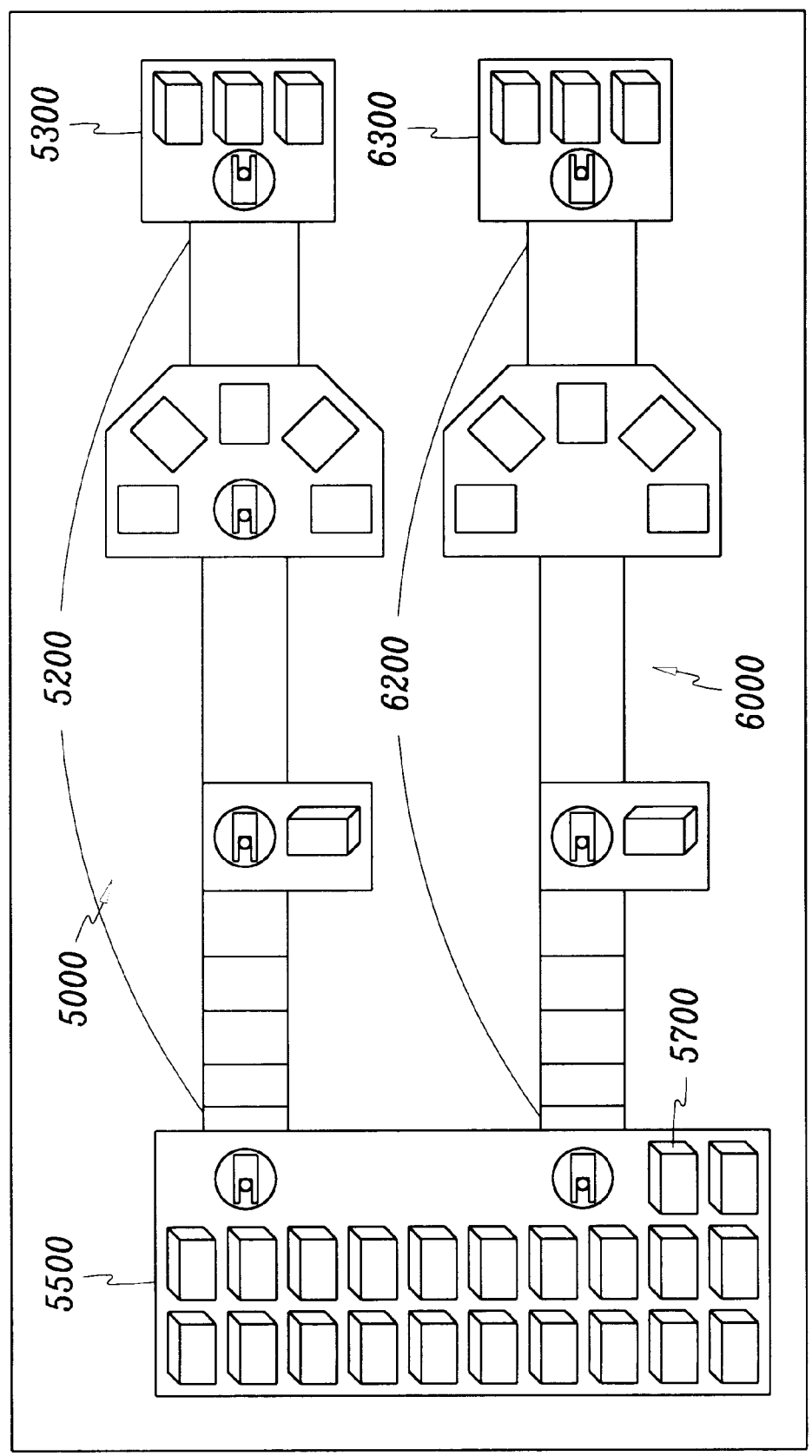
FIG. 8 is a block diagram of an automation system for assembling a workpiece according to a fourth preferred embodiment of the present invention.

FIG. 8 shows a block diagram of an automation system for assembling a workpiece according to a fourth preferred embodiment of the present invention. The automation system includes a TFT line 5000 and a CF line 6000. A TFT cassette receiver and a CF cassette receiver are integrated in a single stocker 5500. The stocker 5500 is provided on one end of both the TFT line 5000 and the CF line 6000. The stocker 5500 includes a dummy cassette 5700 holding dummy substrates. The TFT line 5000 includes a TFT operation section 5200 and a TFT unloader 5300, and the CF line 6000 includes a CF operation section 6200 and a CF unloader 6300.

The structure of the automation system of the fourth embodiment is identical to that of the third embodiment except that the TFT cassette receiver, in addition to the CF cassette receiver, is integrated with the single stocker 5500, and the stocker 5500 is used for both the TFT and CF cassettes. With this configuration, the TFT and CF substrate shortage and supply problem can be prevented. Here, the TFT substrates and the CF substrates are automatically supplied without user manipulation, and it is automatically controlled to assure that a TFT substrate is matched with an identical-grade CF substrate after the production process is restarted. Furthermore, the dummy substrates, according to the fourth embodiment, can be supplied to both the TFT line 5000 and the CF line 6000. This can be controlled either by the host computer or by the equipment.

Figure 9:
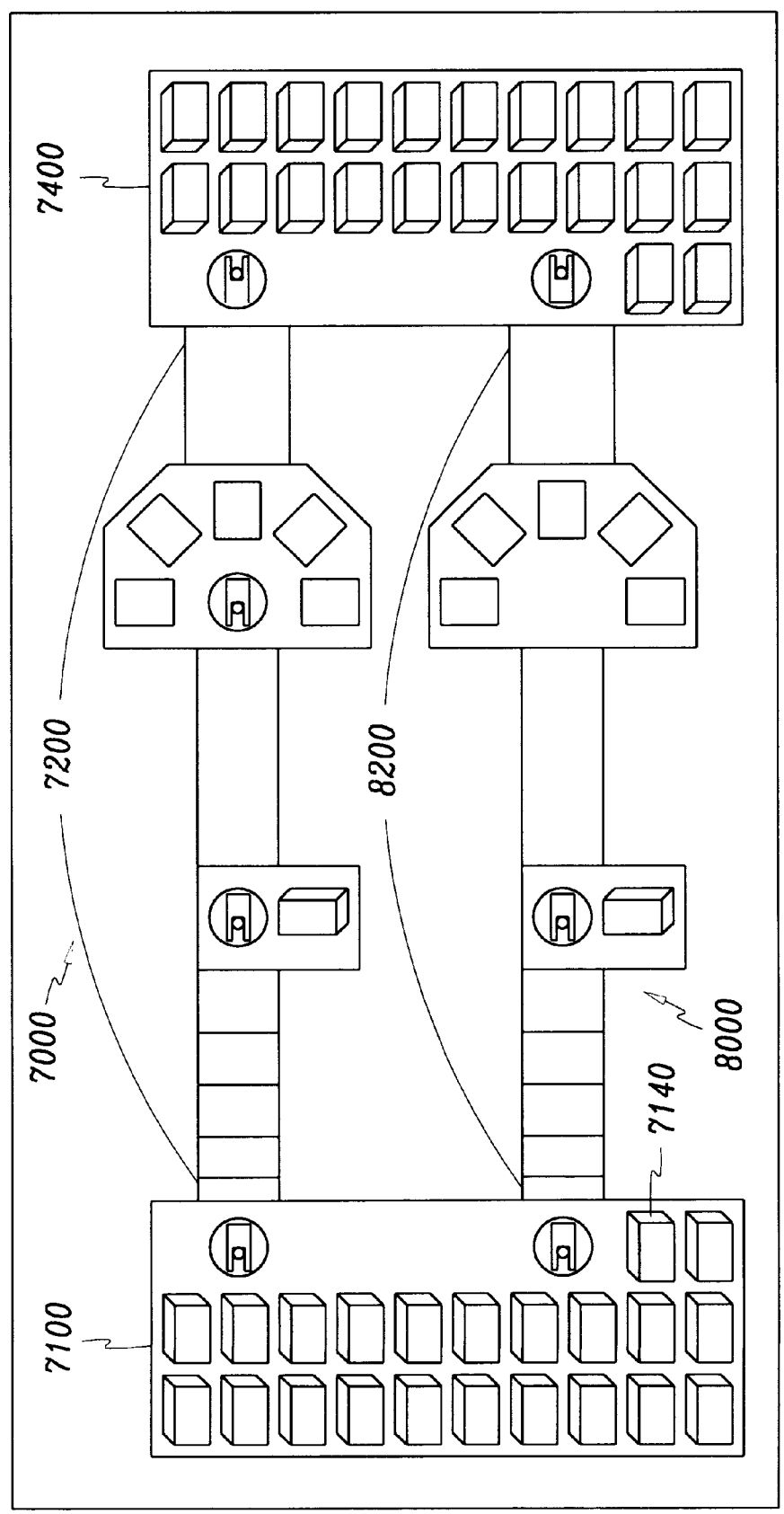
FIG. 9 is a block diagram of an automation system for assembling a workpiece according to a fifth preferred embodiment of the present invention.

FIG. 9 shows a block diagram of an automation system for assembling a workpiece according to a fifth preferred embodiment of the present invention. The automation system includes a TFT line 7000 having a TFT operation section 7200, and a CF line 8000 having a CF operation section 8200. Further, TFT and CF cassette receivers are integrated with a first stocker 7100, and TFT and CF unloaders are integrated with a second stocker 7400. The second stocker 7400 makes it possible to retrieve finished substrates to complete pairs of matching TFT and CF substrates. For example, if there are total 18 TFT substrates completed by the TFT operation section 7200, but only 17 CF substrates completed by the CF operation section 8200, a finished CF substrate in the second stocker 7400 can be used to complete the pair with the extra TFT substrate.

The stocker 5500 of the fourth embodiment and the first stocker 7100 of the fifth embodiment are identical in operation. That is, like the stocker 5500 of the fourth embodiment, the first stocker 7100 of the fifth embodiment includes a dummy cassette 7140 holding dummy substrates, and is integrated with a TFT cassette receiver of the TFT line 7000 and a CF cassette receiver of the CF line 8000. The dummy cassette is used for the same reasons as described in the automation system of the third and fourth embodiments.

Figure 10:
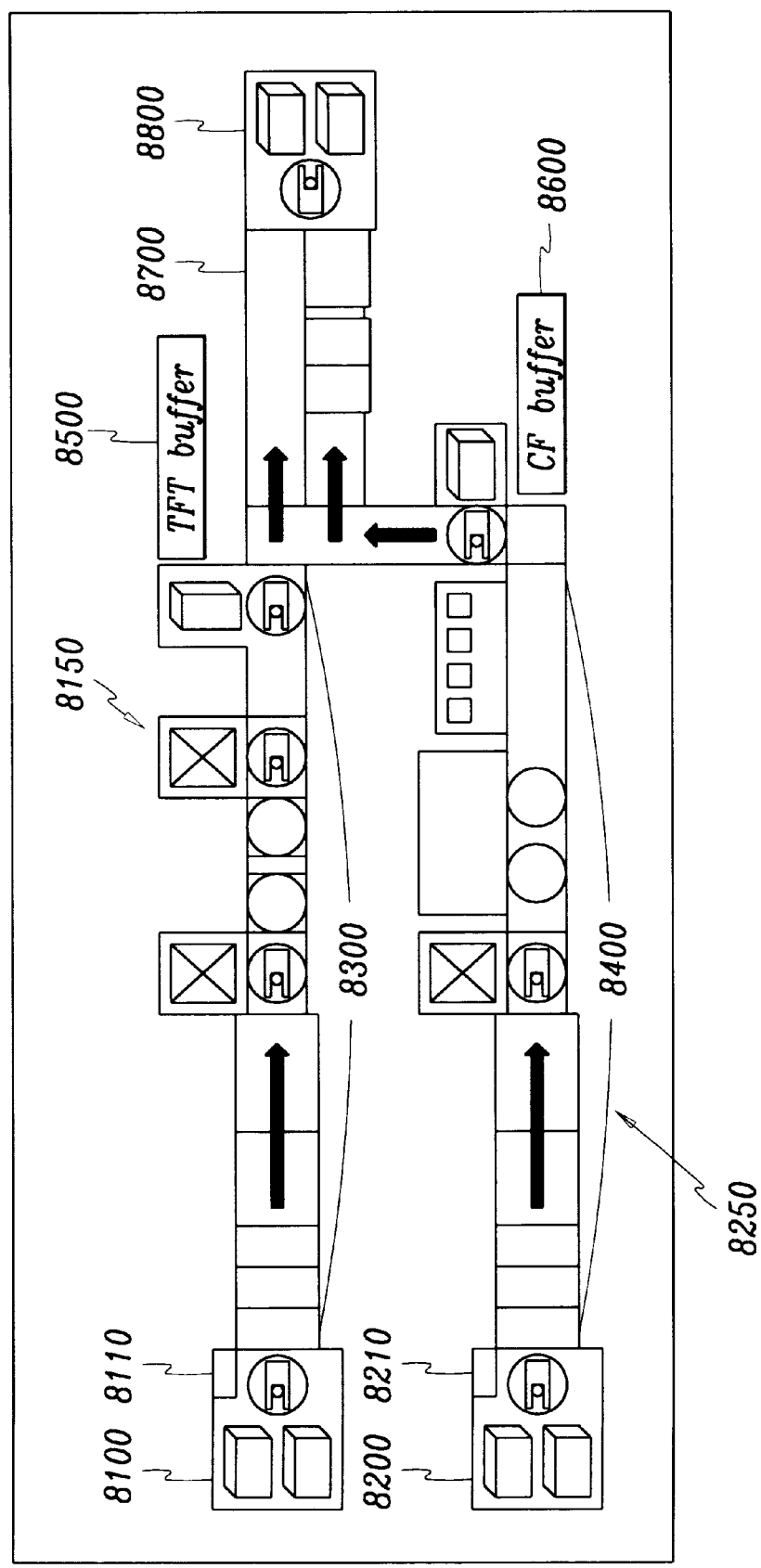
FIG. 10 is a block diagram of an automation system for assembling a workpiece according to a sixth preferred embodiment of the present invention.

FIG. 10 shows a block diagram of an automation system for assembling a workpiece according to a sixth preferred embodiment of the present invention. In the sixth embodiment, TFT and CF substrates are paired beforehand according to a grade, and the substrates in the pair are given an identification (hereinafter referred to as a "GLASSID"). For example, if the TFT substrate has a grade of 1, the GLASSID is AAAAAAA.1, and if the CF substrate paired with this TFT substrate also has a grade of 1, a GLASSID of AAAAAAAZ.1 is given. This data is pre-stored in a host computer (not shown) which controls the automation system of the sixth embodiment and transmits the data to the automation system before operation.

A TFT line 8150 includes a TFT cassette receiver 8100 and a TFT operation section 8300, and a CF line 8250 includes a CF cassette receiver 8200 and a CF operation section 8400. Vericode readers 8110 and 8210 are respectively provided in the TFT cassette receiver 8100 and the CF cassette receiver 8200. The vericode readers 8110 and 8210 read the GLASSIDs of the TFT substrate and the CF substrate, respectively, and compares them with the data received from the host. With this configuration, it is determined whether the TFT substrate and the CF substrate make a matching pair. If the GLASSIDs of the substrates match, the timing of supplying the substrates to the TFT operation section 8300 and the CF operation section 8400 is synchronized, after which the substrates are simultaneously supplied to the operation sections 8300 and 8400.

After the substrates are supplied to the TFT operation section 8300 and the CF operation section 8400, the TFT substrate undergoes in sequence cleaning, heating and spacer dispersing. Then, the TFT substrate goes to a TFT buffer 8500. The CF substrate undergoes in sequence cleaning, heating and sealant attaching. The CF substrate then goes to a CF buffer 8600. In the TFT buffer 8500 and the CF buffer 8600, the GLASSIDs of the received TFT and CF substrates are checked again to make sure that the substrates are of the same grade. If it is determined that the substrates have the same grade, the substrates are then transmitted to an assembler 8700. The buffers 8500 and 8600 checks the substrates again because the substrates may be removed from the operation sections 8300 and 8400 when a defect occurs in the substrates.

When checking again the GLASSIDs of the substrates, if the substrates have different GLASSIDs, and therefore different grades, the normal substrate paired with the defective substrate is held either in the TFT buffer 8500 or the CF buffer 8600, depending on which of the two substrates is normal. For example, if the TFT substrate is rejected or needs to undergo reprocessing, the CF substrate originally paired with the TFT substrate is stored in the CF buffer 8600. Accordingly, the TFT buffer 8500 and the CF buffer 8600 prevent the TFT panels from being assembled using substrates of different grade when a defect occurs in one of the substrates. A TFT substrate and a CF substrate of the same grade are transmitted to the assembler 8700 respectively from the TFT buffer 8500 and the CF buffer 8600. The TFT substrate and the CF substrate are assembled together in the assembler 8700, then are placed in a cassette provided in an unloader 8800.

Figure 11:
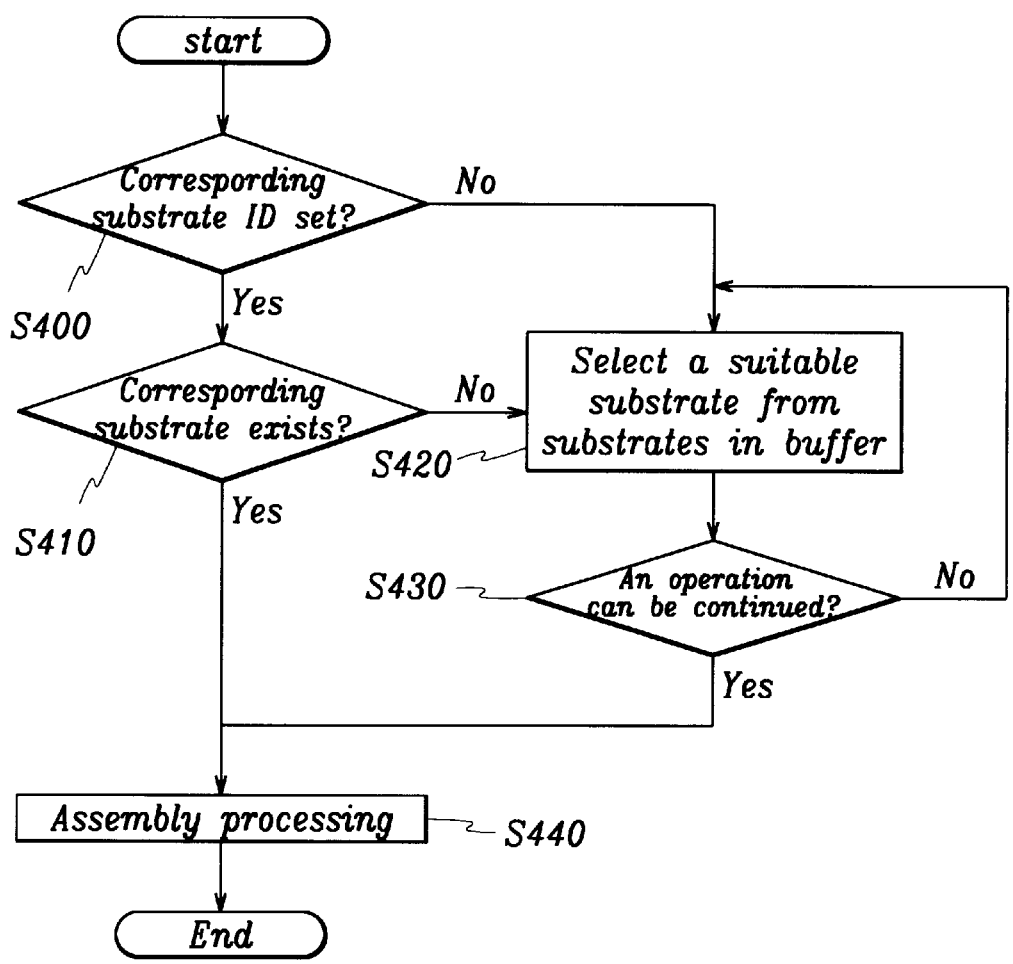
FIG. 11 is a flow chart of an operation of buffers of the automation system shown in FIG. 10.

FIG. 11 shows a flow chart of an operation of the buffers of the automation system shown in FIG. 10. First, in step S400, it is determined if a CF GLASSID corresponding to a TFT GLASSID has been set. If it is determined that the CF GLASSID corresponding to the TFT GLASSID has been set, it is then determined if there is actually a corresponding CF substrate in the CF buffer 8600 (step S410). Next, if it is determined that there is a corresponding CF substrate in the CF buffer 8600, both the TFT substrate and the CF substrate are transmitted to the assembler 8700 (step S440).

If it is determined in step S400 above that a CF GLASSID corresponding to a TFT GLASSID has not been set, or in step S410 that there is not a CF substrate corresponding to the TFT GLASSID, a CF substrate of the same grade as the TFT substrate is selected from the CF substrates leftover in the CF buffer. Subsequently, the CF substrate is paired with the TFT substrate in the TFT buffer 8500 and it is determined if the operation can be continued (step S430). After step S430, the process is continued with step S440 of transmitting the TFT and CF substrates to the assembler 8700.

Figure 12:
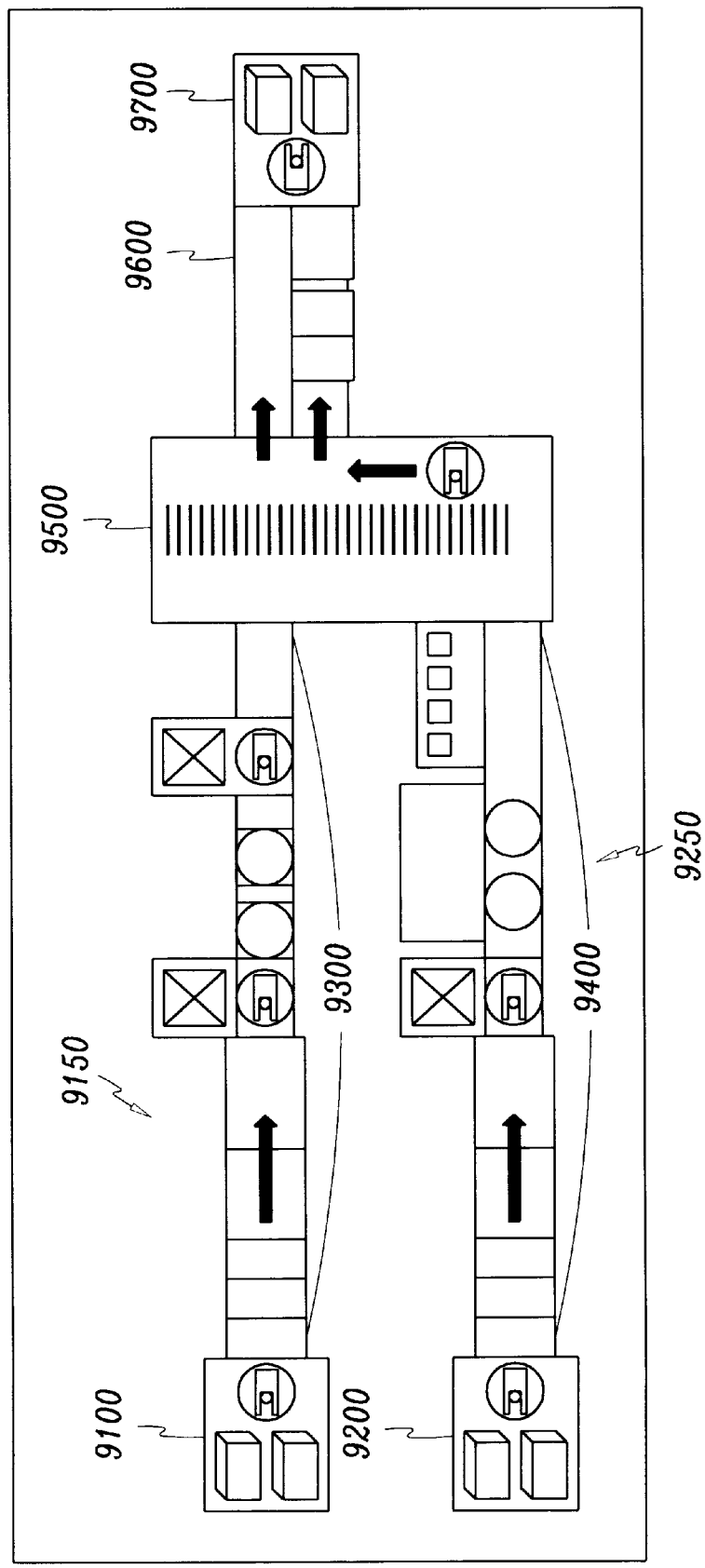
FIG. 12 is a block diagram of an automation system for assembling a workpiece according to a seventh preferred embodiment of the present invention.

FIG. 12 is a block diagram of an automation system for assembling a workpiece according to a seventh preferred embodiment of the present invention. The automation system includes a TFT line 9150 and a CF line 9250. The TFT line 9150 includes a TFT cassette receiver 9100 and a TFT operation section 9300, and the CF line 9250 includes a CF cassette receiver 9200 and a CF operation section 9400. Provided at downstream ends of the TFT line 9150 and the CF line 9250 is a stocker 9500. The stocker 9500 is connected to both the TFT and CF lines 9150 and 9250. With this configuration, there is no need for vericode readers as in the sixth embodiment, and instead, substrates are paired in the stocker 9500 according to a grade. Namely, the stocker 9500 receives GLASSIDs of each substrate from a host (not shown) and pairs the substrates using this information. A TFT substrate and a CF substrate paired to have the same grade are then supplied to an assembler 9600 where the substrates are assembled together. Then, the assembled substrates are supplied to a cassette in unloader 9700.

In the automation system according to the seventh preferred embodiment structured, the productivity is improved by omitting the step of reading GLASSIDs of the substrates and pairing the substrates according to a grade in the TFT and CF cassette receivers 9100 and 9200. Further, the process of matching a substrate after losing the original paired substrate due to a defect or re-processing is not required in the seventh embodiment. Accordingly, the complexity of the system is reduced.

In the automation system for assembling paired workpieces according to the various preferred embodiments described above, in addition to the automation methods described above, the efficiency in producing such paired workpieces is greatly enhanced by automatically pairing substrates according to which, if any, of their cells are defective.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims. For example, although the present invention was described with its application to the production of TFT-LCD panels, it should be clear to those in the art that the invention can also be applied to other display configurations such as plasma display panels and vacuum fluorescent displays.

What is claimed is:

1. An automation system for assembling a workpiece, comprising:
   a host that controls the workflow;
   a storage having a plurality of first parts and a plurality of second parts; and
   a sorter that selects the parts according to information on the parts, wherein said sorter receives information on a first part and selects a second part corresponding to the first part based on the received information.

2. An automation system for assembling a workpiece, comprising:
   a host that controls the workflow;
   a storage having a plurality of first parts and a plurality of second parts; and
   a sorter that selects the parts according to information on the parts, wherein said sorter receives information on a first part and selects a second part corresponding to the first part based on the received information,
   wherein the first parts have different grades of defects and the second parts have different grades of defects; and
   wherein said sorter pairs the first part and the second part for a subsequent process based on the grade of defects.

3. The automation system of claim 2, wherein said storage further comprises;
   a first storage having a plurality of first parts;
   a second storage having a plurality of second parts;
   wherein said second storage communicates with said first storage and has said sorter select a second part that corresponds to a first part to pair them for a subsequent process.

4. The automation system of claim 3, wherein the first parts are thin film transistor (TFT) substrates for a liquid crystal display and the second parts are color filter (CF) substrates for a liquid crystal display.

5. The automation system of claim 4, wherein the first storage and the second storage are respectively a stocker.

6. The automation system of claim 2, wherein the first parts are thin film transistor (TFT) substrates for a liquid crystal display and the second parts are color filter (CF) substrates for a liquid crystal display.

7. The automation system of claim 6, wherein the storage is a stocker.

8. A method for automating the assembly of a first part and a second part, each of the first part and the second part with different grades of defects being stored in a storage, comprising steps of:
 (a) receiving a first part;
 (b) determining the grade of defects of the first part;
 (c) searching a second part with a grade of defects corresponding to that of the first part;
 (d) selecting the second part with a grade of defects corresponding to that of the first part and placing the selected second part in a new storage, if a second part with a grade of defect corresponding to that of the first part is found;
 (e) holding the first part, if a second part with a grade of defect corresponding to that of the first part is not found;
 (f) supplying the first part and the second part to their respective following production steps, if a second part with a grade of defect corresponding to that of the first part is found; and
 (g) continuing following production steps.

9. The method of claim 8, wherein steps (a) through (f) are repeated until the new storage is filled up.

10. The method of claim 8, wherein the first part is a thin film transistor substrate for a liquid crystal display and the second part is a color filter substrate for a liquid crystal display and the storage is a cassette.

11. A method for automating the assembly of a first part and a second part, each of the first part and the second part having different grades of defects and IDs corresponding to the grades of defects, comprising steps of:
 determining whether an ID of a second part matches with an ID of the first part;
 determining whether there is a second part if the ID of the second part matches with the ID of the first part;
 processing the first part and the second part in synchronization when there is a second part;
 comparing the ID of the first part with the ID of the second part after processing; and
 selecting the second part that matches by ID with the first part among a plurality of second parts remaining from previous unsuccessful attempts to make a pair with a first part, when the ID of the second part does not match with the ID of the first part.

12. The method of claim 11, wherein the first part is a thin film transistor substrate for a liquid crystal display and the second part is a color filter substrate for a liquid crystal display.

13. An automation system for assembling a workpiece, comprising:
 a host for controlling a workflow;
 a first line for processing a first part, comprising a first receiving area, a first operation section and a first unloading area; and
 a second line for processing a second part, comprising a second receiving area, a second operation section and a second unloading area,
 wherein said first line and said second line are communicatively coupled to each other,
 wherein the first part has a different grade of defects and the second part has a different grade of defects
 wherein the first line determines the grade of defects when it receives a first part, and sends information on the first part's grade of defects to the second line,
 wherein the second line receives the information on the first part's grade of defects from the first line and selects a second part corresponding to the first part's grade of defects, and
 wherein the received first part is processed in the first operation section and the selected second part is processed in the second operation section, when the second line reports that a second part corresponding to the first part's grade of defect is found.

14. The automation system of claim 13, wherein the first receiving area has a device that can determine the first part's grade of defects and transmit information on the first part's grade of defects to the second line, while receiving information on the selection of the second part corresponding to the first part,
 wherein the operation section can perform a sequential production process on the first part,
 wherein the second receiving area has a device that can receive information on the first part's grade of defects and select a second part that corresponds to the information on the first part's grade of defects, while sending information on the selection of the second part corresponding to the first part, and
 wherein the second operation section can perform a sequential production process on the second part.

15. The automation system of claim 14, wherein the first part is a thin film transistor substrate for a liquid crystal display and the second substrate is a color filter substrate for a liquid crystal display,
 wherein the first receiving area is a thin film transistor substrate cassette receiver and the second receiving area is a color filter substrate cassette receiver, and
 wherein the first unloading area is a thin film transistor substrate cassette unloader and the second unloading area is a color filter substrate cassette unloader.

16. The automation system of claim 15, wherein the sequential production process on the first part is for a thin film transistor substrate for a liquid crystal display and comprises cleaning, heating, alignment layer coating, and inspection, and
 wherein the sequential production process on the second part is for a color filter substrate for a liquid crystal display and comprises cleaning, heating, alignment layer coating, and inspection.

17. The automation system of claim 16, wherein the thin film transistor substrate unloader has a cassette that can store the thin film transistor substrate for a liquid crystal display after finishing the sequential production process, and
 wherein the color filter substrate cassette unloader has a cassette that can store the color filter substrate for a liquid crystal display after finishing the sequential production process.

18. The automation system of claim 17, wherein the color filter substrate cassette receiver holds a plurality of cassettes, each cassette loaded with color filter substrates of the same grade.

19. The automation system of claim 17, wherein the color filter substrate cassette receiver is integrated with a stocker.

20. The automation system of claim 17, wherein the thin film transistor substrate cassette receiver and the color filter substrate cassette receiver are integrated with a stocker.

21. The automation system of claim 17, wherein the thin film transistor substrate cassette receiver has a plurality of dummy substrates that can be fed through the first line during the system preparation period or when the second line is malfunctioning.

22. The automation system of claim 17, wherein the color filter substrate cassette receiver has a plurality of dummy substrates that can be fed through the second line during the system preparation period or when the first line is malfunctioning.

23. The automated system of claim 17, wherein the thin film transistor substrate cassette receiver and the color filter substrate cassette receiver are integrated with a first stocker; and wherein the thin film transistor substrate cassette unloader and the color filter substrate cassette unloader are integrated with a second stocker.

24. The automation system of claim 23, wherein the thin film transistor substrate and the color filter substrate are paired after finishing their respective sequential production process at the second stocker.

25. An automation system for assembling a workpiece, comprising:

a host for controlling a workflow;

a first line for processing a first part, comprising a first receiving area, a first operation section and a first unloading area;

a second line for processing a second part, comprising a second receiving area, a second operation section and a second unloading area;

a first buffer connected to a downstream end of the first operation section;

a second buffer connected to a downstream end of the second operation section;

an assembler connected both to the first unloading area and to the second unloading area; and an unloader having a storage that can store a finished product, wherein said first line and said second line are communicatively coupled to each other.

26. The automation system of claim 25, wherein the first buffer and the second buffer respectively checks the grades of the first part and the second part and ensures that the first part corresponds to the second part, and wherein the assembler receives the first part and the second part from the buffers and assembles them.

27. The automation system of claim 26, wherein the first part is a thin film transistor substrate for a liquid crystal display and the second part is a color filter substrate for a liquid crystal display and the first part and the second part are assembled to produce a panel.

28. The automation system for claim 27, wherein the first receiving area is a thin film transistor substrate cassette receiver having a device to hold a thin film transistor substrate and a vericode reader to read the IDs of the thin film transistor substrate; and wherein the second receiving area is a color filter substrate cassette receiver having a device to hold a color filter substrate and a vericode reader to read the IDs of the color filter substrate.

29. The automation system of claim 27, wherein the first operation section performs sequential production processes for a thin film transistor substrate, comprising cleaning, heating and spacer dispersing; and wherein the second operation section performs sequential production processes for a color filter substrate, comprising cleaning, heating and sealant attaching.

30. The automation system of claim 27, wherein if the first buffer and the second buffer determines that the thin film transistor substrate corresponds to the color filter substrate, the first buffer and the second buffer respectively transmit the thin film transistor substrate and the color filter substrate to the assembler.

31. The automation system of claim 30, wherein if it is determined that the thin film transistor substrate or the color filter substrate adds a defect in the operation section, the first buffer or the second buffer returns these substrates for reprocessing.

32. The automation system of claim 31, wherein the first buffer or the second buffer stores either the remaining thin film transistor substrate or the color filter substrate and pairs the remaining substrates with the following remaining substrates having the same grades.

33. The automation system for claim 27, wherein the buffer of the first line and the buffer of the second line are integrated with a stocker.

34. The automation system of claim 33, wherein the first receiving area is a thin film transistor substrate cassette receiver and the second receiving area is a color filter substrate cassette receiver, and wherein the stocker pairs the thin film transistor substrate and the color filter substrate.

* * * * *